United States Patent
Mizuno et al.

(10) Patent No.: US 6,377,390 B1
(45) Date of Patent: Apr. 23, 2002

(54) OPTICAL GAIN EQUALIZER, AND OPTICAL AMPLIFIER AND WAVELENGTH-DIVISION MULTIPLEX TRANSMITTER BOTH COMPRISING THE OPTICAL GAIN EQUALIZER

(75) Inventors: Kazuyo Mizuno; Shyoichi Ozawa; Osamu Aso; Shu Namiki; Ikuo Ohta; Yuichiro Irie, all of Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/486,562
(22) PCT Filed: Jul. 2, 1999
(86) PCT No.: PCT/JP99/03592
  § 371 Date: Mar. 3, 2000
  § 102(e) Date: Mar. 3, 2000
(87) PCT Pub. No.: WO00/02291
  PCT Pub. Date: Jan. 13, 2000

(30) Foreign Application Priority Data

Jul. 7, 1998 (JP) .......................................... 10-191923

(51) Int. Cl.$^7$ ................................................ H01S 3/00
(52) U.S. Cl. .................................. 359/337.1; 359/337.2
(58) Field of Search ......................... 359/337.1, 337.2, 359/337.21, 337.22, 161

(56) References Cited

U.S. PATENT DOCUMENTS 5,864,424 A * 1/1999 Nakano ....................... 359/341
5,880,874 A * 3/1999 Shibuya et al. .............. 359/337

FOREIGN PATENT DOCUMENTS

JP        A-9-289349        11/1997

* cited by examiner

Primary Examiner—Mark Hellner

(57) ABSTRACT

In an optical gain equalizer according to the present invention, a plurality of etalon filters 1 and one ore more fiber gratings 2 or dielectric multilayer filters 3 are arranged in line, and a beam of light externally applied is passed through the etalon filters 1 and the fiber gratings 2 or dielectric multilayer filters 3 and outputted to the outside, and the etalon filters 1 have sinusoidal wave loss characteristic of the same amplitude and period as those of the term obtained by Fourier series expansion of the loss wavelength characteristic for gain flattening, and the one or more fiber gratings 2 or dielectric multilayer filters 3 compensate the ripple component remaining as the difference between the loss wavelength characteristic for gain flattening and the loss wavelength characteristic owing to the etalon filters 1. An optical amplifying device 14 is constituted by combining an optical amplifier 5 with the optical gain equalizer 4. A wavelength-division multiplex transmitter is constituted by using the optical amplifying device 14.

53 Claims, 7 Drawing Sheets

FIG. 3A
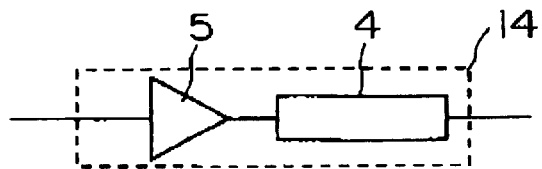
FIG. 3B
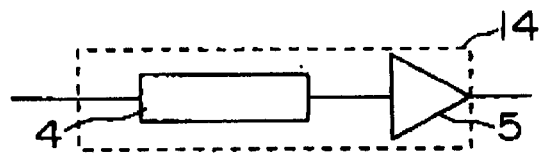
FIG. 3C
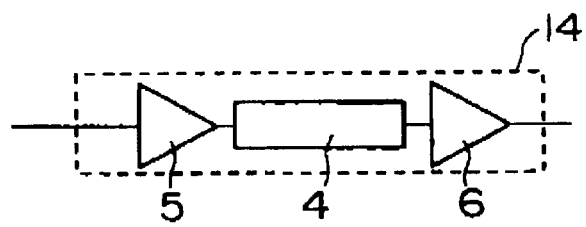
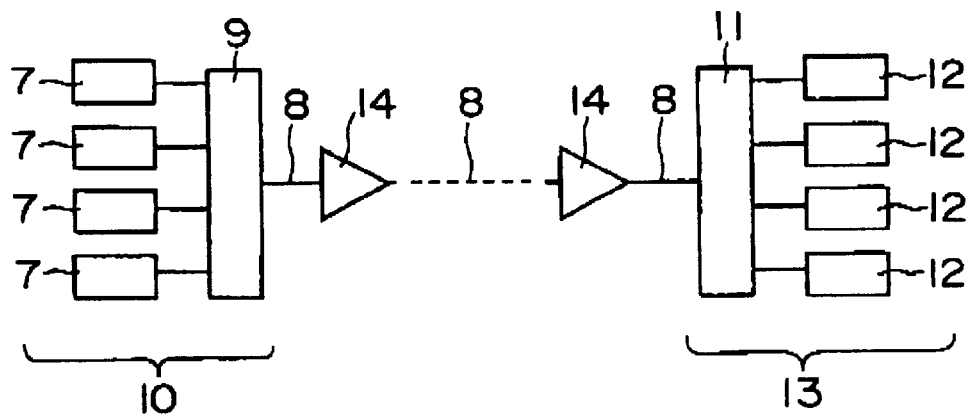
FIG. 4

―――― PERMEATION CHARACTERISTIC REQUIRED FOR FLATTENING
- - - - - - PERMEATION CHARACTERISTIC BY COMBINATION OF ETALONS
― - ― RIPPLE COMPONENT WHICH COULD NOT BE COMPENSATED BY ETALONS

OPTICAL GAIN EQUALIZER, AND OPTICAL AMPLIFIER AND WAVELENGTH-DIVISION MULTIPLEX TRANSMITTER BOTH COMPRISING THE OPTICAL GAIN EQUALIZER

BACKGROUND OF THE INVENTION

1. Field of the Invention

The present invention relates to an optical gain equalizer for eliminating level deviation of a wavelength division multiplexing light due to wavelength dependency of gain of an erbium doped optical fiber amplifier and wavelength dependency of a transmission system, and an optical amplifier and a wavelength-division multiplex transmitter both comprising such an optical gain equalizer.

2. Related Background Art

Long distance and great capacity optical transmission techniques which have remarkably been progressed in recent years are technically based on an optical fiber amplifier using a rare earth doped optical fiber and a wavelength division multiplexing (referred to as "WDM" hereinafter) transmission.

Nowadays, many optical fiber amplifiers using an orbium doped optical fiber have been developed and put to practical use in various fields, as well as the transmission systems. On the other hand, gain of the optical fiber amplifier has wavelength dependency. Accordingly, when the optical fiber amplifier is used in the WDM transmission system, and particularly when a number of optical fiber amplifiers are interconnected in a cascade manner, the wavelength dependency of the gain arises a problem. If the gain has the wavelength dependency, level deviation is generated in an amplified wavelength division multiplexing light, thereby deteriorating cross-talk between wavelengths and worsening setting of light receiving level of a receiver.

Although the optical fiber amplifier itself has been developed to minimize its gain wavelength dependency, in the WDM transmission system in which the amplifiers are interconnected in a multi stage manner, in order to eliminate the wavelength dependency of the gain of each optical fiber amplifier, optical gain equalizers are used.

Regarding the optical gain equalizer, although an equalizer using an etalon filter, an equalizer using an optical fiber coupler, an equalizer using an interference film filter comprised of a dielectric multilayer film, an equalizer using grating (fiber-type grating or grating provided on a glass substrate), an equalizer using a Mach-Zehnder type optical filter and the like have been developed, for several reasons (Japanese Patent Application No. 9-289349 (1997) describes kinds and problems of the optical gain equalizer), the equalizer using the etalon filter has been expected.

The etalon filter has a sinusoidal wave loss characteristic, so that loss characteristic having desired wavelength dependency can be created by combining a plurality of etalon filters having different characteristics. Thus, in the optical gain equalizer, as shown in FIG. 9, a plurality of etalon filters A having a sinusoidal wave loss characteristic of the same amplitude and period as those of the term obtained by Fourier series expansion of a gain curve for gain flattening are prepared, and these filters are arranged in cascade, so that a light (wavelength division multiplexing light) between optical fibers D and E is passed through the group of filters by using collimator lenses B, C, thereby completely eliminating the wavelength dependency of the gain.

In the optical gain equalizer obtained by combining the etalon filters A shown in FIG. 9, in principle, the greater the number of filters to be combined, the more complete elimination of the wavelength dependency of the gain. However, in consideration of manufacturing viewpoint and total permeation loss, the number of etalon filters which can be combined is limited to about four. Accordingly, it is difficult to eliminate the wavelength dependency of the gain completely, and substantial flattening becomes about 1 dB.

SUMMARY OF THE INVENTION

An object of the present invention is to provide an optical gain equalizer in which gain wavelength dependency of an optical fiber amplifier can be compensated to an error of about 0.1 dB by utilizing etalon filters and in which deviation dependency of permeability is small and which can easily be manufactured. Another object of the present invention is to provide an optical fiber amplifier in which wavelength dependency of gain becomes small by using such an optical gain equalizer and a wavelength-division multiplex transmitter in which such optical fiber amplifiers in a multi-stage manner.

In an optical gain equalizer according to a first aspect of the present invention, a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges.

In an optical gain equalizer according to a second aspect of the present invention, a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges, and have a sinusoidal wave loss characteristic of the same amplitude and period as those of the term obtained by Fourier series expansion of the loss wavelength characteristic for gain flattening.

In an optical gain equalizer according to a third aspect of the present invention, a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges, and the one or more fiber gratings or dielectric multilayer filters compensate the ripple component remaining as the difference between the loss wavelength characteristic for gain flattening and the loss wavelength characteristic owing to the etalon filters.

In an optical gain equalizer according to a fourth aspect of the present invention, a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges, and have a sinusoidal wave loss characteristic of the same amplitude and period as those of the term obtained by Fourier series expansion of the loss wavelength characteristic for gain flattening, and the one or more fiber gratings or dielectric multilayer filters compensate the ripple component remaining as the difference between the loss wavelength characteristic for gain flattening and the loss wavelength characteristic owing to the etalon filters.

According to a fifth aspect of the present invention, an optical amplifying device comprises an optical gain equalizer in which a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges; and a first optical amplifier for amplifying a wavelength division multiplexing light.

According to a sixth aspect of the present invention, an optical amplifying device comprises an optical gain equalizer in which a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges, and have a sinusoidal wave loss characteristic of the same amplitude and period as those of the term obtained by Fourier series expansion of the loss wavelength characteristic for gain flattening; and a first optical amplifier for amplifying a wavelength division multiplexing light.

According to a seventh aspect of the present invention, an optical amplifying device comprises an optical gain equalizer in which a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges, and the one or more fiber gratings or dielectric multilayer filters compensate the ripple component remaining as the difference between the loss wavelength characteristic for gain flattening and the loss wavelength characteristic owing to the etalon filters; and a first optical amplifier for amplifying a wavelength division multiplexing light.

According to an eighth aspect of the present invention, an optical amplifying device comprises an optical gain equalizer in which a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges, and have a sinusoidal wave loss characteristic of the same amplitude and period as those of the term obtained by Fourier series expansion of the loss wavelength characteristic for gain flattening, and the one or more fiber gratings or dielectric multilayer filters compensate the ripple component remaining as the difference between the loss wavelength characteristic for gain flattening and the loss wavelength characteristic owing to the etalon filters; and a first optical amplifier for amplifying a wavelength division multiplexing light.

According to a ninth aspect of the present invention, there is provided an optical amplifying device comprising an optical gain equalizer in which a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges; and a first optical amplifier for amplifying a wavelength division multiplexing light, and wherein the optical gain equalizer is arranged before or after the first optical amplifier.

According to a tenth aspect of the present invention, there is provided an optical amplifying device comprising an optical gain equalizer in which a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon fibers have different free spectrum ranges, and have a sinusoidal wave loss characteristic of the same amplitude and period as those of the term obtained by Fourier series expansion of the loss wavelength characteristic for gain flattening; and a first optical amplifier for amplifying a wavelength division multiplexing light, and wherein the optical gain equalizer is arranged before or after the first optical amplifier.

According to an eleventh aspect of the present invention, there is provided an optical amplifying device comprising an optical gain equalizer in which a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges, and the one or more fiber gratings or dielectric multilayer filters compensate the ripple component remaining as the difference between the loss wavelength characteristic for gain flattening and the loss wavelength characteristic owing to the etalon filters; and a first optical amplifier for amplifying a wavelength division multiplexing light, and wherein the optical gain equalizer is arranged before or after the first optical amplifier.

According to a twelfth aspect of the present invention, there is provided an optical amplifying device comprising an optical gain equalizer in which a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges, and have a sinusoidal wave loss characteristic of the same amplitude and period as those of the term obtained by Fourier series expansion of the loss wavelength characteristic for gain flattening, and the one or more fiber gratings or dielectric multilayer filters compensate the ripple component remaining as the difference between the loss wavelength characteristic for gain flattening and the loss wavelength characteristic owing to the etalon filters; and a first optical amplifier for amplifying a wavelength division multiplexing light, and wherein the optical gain equalizer is arranged before or after the first optical amplifier.

According to a thirteenth aspect of the present invention, an optical amplifying device comprises an optical gain equalizer in which a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges; and first and second optical amplifiers for amplifying a wavelength division multiplexing light.

According to a fourteenth aspect of the present invention, an optical amplifying device comprises an optical gain equalizer in which a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges, and have a sinusoidal wave loss characteristic of the same amplitude and period as those of the term obtained by Fourier series expansion of the loss wavelength characteristic for gain flattening; and first and second optical amplifiers for amplifying a wavelength division multiplexing light.

According to a fifteenth aspect of the present invention, an optical amplifying device comprises an optical gain equalizer in which a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges, and the one or more fiber gratings or dielectric multilayer filters compensate the ripple component remaining as the difference between the loss wavelength characteristic for gain flattening and the loss wavelength characteristic owing to the etalon filters; and first and second optical amplifiers for amplifying a wavelength division multiplexing light.

According to a sixteenth aspect of the present invention, an optical amplifying device comprises an optical gain equalizer in which a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges, and have a sinusoidal wave loss characteristic of the same amplitude and period as those of the term obtained by Fourier series expansion of the loss wavelength characteristic for gain flattening, and the one or more fiber gratings or dielectric multilayer filters compensate the ripple component remaining as the difference between the loss wavelength characteristic for gain flattening and the loss wavelength characteristic owing to the etalon filters; and first and second optical amplifiers for amplifying a wavelength division multiplexing light.

According to a seventeenth aspect of the present invention, there is provided an optical amplifying device comprising an optical gain equalizer in which a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges; and first and second optical amplifiers for amplifying a wavelength division multiplexing light, and wherein the optical gain equalizer is arranged between the first and second optical amplifiers.

According to an eighteenth aspect of the present invention, there is provided an optical amplifying device comprising an optical gain equalizer in which a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges, and have a sinusoidal wave loss characteristic of the same amplitude and period as those of the term obtained by Fourier series expansion of the loss wavelength characteristic for gain flattening; and first and second optical amplifiers for amplifying a wavelength division multiplexing light, and wherein the optical gain equalizer is arranged between the first and second optical amplifiers.

According to a nineteenth aspect of the present invention, there is provided an optical amplifying device comprising an optical gain equalizer in which a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges, and the one or more fiber gratings or dielectric multilayer filters compensate the ripple component remaining as the difference between the loss wavelength characteristic for gain flattening and the loss wavelength characteristic owing to the etalon filters; and first and second optical amplifiers for amplifying a wavelength division multiplexing light, and wherein the optical gain equalizer is arranged between the first and second optical amplifiers.

According to a twentieth aspect of the present invention, there is provided an optical amplifying device comprising an optical gain equalizer in which a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges, and have a sinusoidal wave loss characteristic of the same amplitude and period as those of the term obtained by Fourier series expansion of the loss wavelength characteristic for gain flattening, and the one or more fiber gratings or dielectric multilayer filters compensate the ripple component remaining as the difference between the loss wavelength characteristic for gain flattening and the loss wavelength characteristic owing to the etalon filters; and first and second optical amplifiers for amplifying a wavelength division multiplexing light, and wherein the optical gain equalizer is arranged between the first and second optical amplifiers.

According to a twenty-first aspect of the present invention, there is provided an optical amplifying device comprising an optical gain equalizer in which a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges; and a first optical amplifier for amplifying a wavelength division multiplexing light, and wherein the first optical amplifier is an optical fiber amplifier.

According to a twenty-second aspect of the present invention, there is provided an optical amplifying device comprising an optical gain equalizer in which a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges, and have a sinusoidal wave loss characteristic of the same amplitude and period as those of the term obtained by Fourier series expansion of the loss wavelength characteristic for gain flattening; and a first optical amplifier for amplifying a wavelength division multiplexing light, and wherein the first optical amplifier is an optical fiber amplifier.

According to a twenty-third aspect of the present invention, there is provided an optical amplifying device comprising an optical gain equalizer in which a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges, and the one or more fiber gratings or dielectric multilayer filters compensate the ripple component remaining as the difference between the loss wavelength characteristic for gain flattening and the loss wavelength characteristic owing to the etalon filters; and a first optical amplifier for amplifying a wavelength division multiplexing light, and wherein the first optical amplifier is an optical fiber amplifier.

According to a twenty-fourth aspect of the present invention, there is provided an optical amplifying device comprising an optical gain equalizer in which a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges, and have a sinusoidal wave loss characteristic of the same amplitude and period as those of the term obtained by Fourier series expansion of the loss wavelength characteristic for gain flattening, and the one or more fiber gratings or dielectric multilayer filters compensate the ripple component remaining as the difference between the loss wavelength characteristic for gain flattening and the loss wavelength characteristic owing to the etalon filters; and a first optical amplifier for amplifying a wavelength division multiplexing light, and wherein the first optical amplifier is an optical fiber amplifier.

According to a twenty-fifth aspect of the present invention, there is provided an optical amplifying device comprising an optical gain equalizer in which a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges; and a first optical amplifier for amplifying a wavelength division multiplexing light, and wherein the optical gain equalizer is arranged before or after the first optical amplifier and the first optical amplifier is an optical fiber amplifier.

According to a twenty-sixth aspect of the present invention, there is provided an optical amplifying device comprising an optical gain equalizer in which a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges, and have a sinusoidal wave loss characteristic of the same amplitude and period as those of the term obtained by Fourier series expansion of the loss wavelength characteristic for gain flattening; and a first optical amplifier for amplifying a wavelength division multiplexing light, and wherein the optical gain equalizer is arranged before or after the first optical amplifier and the first optical amplifier is an optical fiber amplifier.

According to a twenty-seventh aspect of the present invention, there is provided an optical amplifying device comprising an optical gain equalizer in which a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges, and the one or more fiber gratings or dielectric multilayer filters compensate the ripple component remaining as the difference between the loss wavelength characteristic for gain flattening and the loss wavelength characteristic owing to the etalon filters; and a first optical amplifier for amplifying a wavelength division multiplexing light, and wherein the optical gain equalizer is arranged before or after the first optical amplifier and the first optical amplifier is an optical fiber amplifier.

According to a twenty-eighth aspect of the present invention, there is provided an optical amplifying device comprising an optical gain equalizer in which a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges, and have a sinusoidal wave loss characteristic of the same amplitude and period as those of the term obtained by Fourier series expansion of the loss wavelength characteristic for gain flattening, and the one or more fiber gratings or dielectric multilayer filters compensate the ripple component remaining as the difference between the loss wavelength characteristic for gain flattening and the loss wavelength characteristic owing to the etalon filters; and a first optical amplifier for amplifying a wavelength division multiplexing light, and wherein the optical gain equalizer is arranged before or after the first optical amplifier and the first optical amplifier is an optical fiber amplifier.

According to a twenty-ninth aspect of the present invention, there is provided an optical amplifying device comprising an optical gain equalizer in which a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges; and first and second optical amplifiers for amplifying a wavelength division multiplexing light, and wherein the first optical amplifier is an optical fiber amplifier.

According to a thirtieth aspect of the present invention, there is provided an optical amplifying device comprising an optical gain equalizer in which a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges, and have a sinusoidal wave loss characteristic of the same amplitude and period as those of the term obtained by Fourier series expansion of the loss wavelength characteristic for gain flattening; and first and second optical amplifiers for amplifying a wavelength division multiplexing light, and wherein the first optical amplifier is an optical fiber amplifier.

According to a thirty-first aspect of the present invention, there is provided an optical amplifying device comprising an optical gain equalizer in which a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges, and the one or more fiber gratings or dielectric multilayer filters compensate the ripple component remaining as the difference between the loss wavelength characteristic for gain flattening and the loss wavelength characteristic owing to the etalon filters; and first and second optical amplifiers for amplifying a wavelength division multiplexing light, and wherein the first optical amplifier is an optical fiber amplifier.

According to a thirty-second aspect of the present invention, there is provided an optical amplifying device comprising an optical gain equalizer in which a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges, and have a sinusoidal wave loss characteristic of the same amplitude and period as those of the term obtained by Fourier series expansion of the loss wavelength characteristic for gain flattening, and the one or more fiber gratings or dielectric multilayer filters compensate the ripple component remaining as the difference between the loss wavelength characteristic for gain flattening and the loss wavelength characteristic owing to the etalon filters; and first and second optical amplifiers for amplifying a wavelength division multiplexing light, and wherein the first optical amplifier is an optical fiber amplifier.

According to a thirty-third aspect of the present invention, there is provided an optical amplifying device comprising an optical gain equalizer in which a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges; and first and second optical amplifiers for amplifying a wavelength division multiplexing light, and wherein the optical gain equalizer is arranged between the first and second optical amplifiers and the first optical amplifier is an optical fiber amplifier.

According to a thirty-fourth aspect of the present invention, there is provided an optical amplifying device comprising an optical gain equalizer in which a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges, and have a sinusoidal wave loss characteristic of the same amplitude and period as those of the term obtained by Fourier series expansion of the loss wavelength characteristic for gain flattening; and first and second optical amplifiers for amplifying a wavelength division multiplexing light, and wherein the optical gain equalizer is arranged between the first and second optical amplifiers and the first optical amplifier is an optical fiber amplifier.

According to a thirty-fifth aspect of the present invention, there is provided an optical amplifying device comprising an optical gain equalizer in which a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges, and the one or more fiber gratings or dielectric multilayer filters compensate the ripple component remaining as the difference between the loss wavelength characteristic for gain flattening and the loss wavelength characteristic owing to the etalon filters; and first and second optical amplifiers for amplifying a wavelength division multiplexing light, and wherein the optical gain equalizer is arranged between the first and second optical amplifiers and the first optical amplifier is an optical fiber amplifier.

According to a thirty-sixth aspect of the present invention, there is provided an optical amplifying device comprising an optical gain equalizer in which a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges, and have a sinusoidal wave loss characteristic of the same amplitude and period as those of the term obtained by Fourier series expansion of the loss wavelength characteristic for gain flattening, and the one or more fiber gratings or dielectric multilayer filters compensate the ripple component remaining as the difference between the loss wavelength characteristic for gain flattening and the loss wavelength characteristic owing to the etalon filters; and first and second optical amplifiers for amplifying a wavelength division multiplexing light, and wherein the optical gain equalizer is arranged between the first and second optical amplifiers and the first optical amplifier is an optical fiber amplifier.

According to a thirty-seventh aspect of the present invention, there is provided an optical amplifying device comprising an optical gain equalizer in which a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges; and a first optical amplifier for amplifying a wavelength division multiplexing light, and wherein the first optical amplifier is an optical semiconductor amplifier.

According to a thirty-eighth aspect of the present invention, there is provided an optical amplifying device comprising an optical gain equalizer in which a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges, and have a sinusoidal wave loss characteristic of the same amplitude and period as those of the term obtained by Fourier series expansion of the loss wavelength characteristic for gain flattening; and a first optical amplifier for amplifying a wavelength division multiplexing light, and wherein the first optical amplifier is an optical semiconductor amplifier.

According to a thirty-ninth aspect of the present invention, there is provided an optical amplifying device comprising an optical gain equalizer in which a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges, and the one or more fiber gratings or dielectric multilayer filters compensate the ripple component remaining as the difference between the loss wavelength characteristic for gain flattening and the loss wavelength characteristic owing to the etalon filters; and a first optical amplifier for amplifying a wavelength division multiplexing light, and wherein the first optical amplifier is an optical semiconductor amplifier.

According to a fortieth aspect of the present invention, there is provided an optical amplifying device comprising an optical gain equalizer in which a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges, and have a sinusoidal wave loss characteristic of the same amplitude and period as those of the term obtained by Fourier series expansion of the loss wavelength characteristic for gain flattening, and the one or more fiber gratings or dielectric multilayer filters compensate the ripple component remaining as the difference between the loss wavelength characteristic for gain flattening and the loss wavelength characteristic owing to the etalon filters; and a first optical amplifier for amplifying a wavelength division multiplexing light, and wherein the first optical amplifier is an optical semiconductor amplifier.

According to a forty-first aspect of the present invention, there is provided an optical amplifying device comprising an optical gain equalizer in which a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges; and a first optical amplifier for amplifying a wavelength division multiplexing light, and wherein the optical gain equalizer is arranged before or after the first optical amplifier and the first optical amplifier is an optical semiconductor amplifier.

According to a forty-second aspect of the present invention, there is provided an optical amplifying device comprising an optical gain equalizer in which a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges, and have a sinusoidal wave loss characteristic of the same amplitude and period as those of the term obtained by Fourier series expansion of the loss wavelength characteristic for gain flattening; and a first optical amplifier for amplifying a wavelength division multiplexing light, and wherein the optical gain equalizer is arranged before or after the first optical amplifier and the first optical amplifier is an optical semiconductor amplifier.

According to a forty-third aspect of the present invention, there is provided an optical amplifying device comprising an optical gain equalizer in which a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges, and the one or more fiber gratings or dielectric multilayer filters compensate the ripple component remaining as the difference between the loss wavelength characteristic for gain flattening and the loss wavelength characteristic owing to the etalon filters; and a first optical amplifier for amplifying a wavelength division multiplexing light, and wherein the optical gain equalizer is arranged before or after the first optical amplifier and the first optical amplifier is an optical semiconductor amplifier.

According to a forty-fourth aspect of the present invention, there is provided an optical amplifying device comprising an optical gain equalizer in which a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges, and have a sinusoidal wave loss characteristic of the same amplitude and period as those of the term obtained by Fourier series expansion of the loss wavelength characteristic for gain flattening, and the one or more fiber gratings or dielectric multilayer filters compensate the ripple component remaining as the difference between the loss wavelength characteristic for gain flattening and the loss wavelength characteristic owing to the etalon filters; and a first optical amplifier for amplifying a wavelength division multiplexing light, and wherein the optical gain equalizer is arranged before or after the first optical amplifier and the first optical amplifier is an optical semiconductor amplifier.

According to a forty-fifth aspect of the present invention, there is provided an optical amplifying device comprising an optical gain equalizer in which a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges; and first and second optical amplifiers for amplifying a wavelength division multiplexing light, and wherein the first optical amplifier is an optical semiconductor amplifier.

According to a forty-sixth aspect of the present invention, three is provided an optical amplifying device comprising an optical gain equalizer in which a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges, and have a sinusoidal wave loss characteristic of the same amplitude and period as those of the term obtained by Fourier series expansion of the loss wavelength characteristic for gain flattening; and first and second optical amplifiers for amplifying a wavelength division multiplexing light, and wherein the first optical amplifier is an optical semiconductor amplifier.

According to a forty-seventh aspect of the present invention, there is provided an optical amplifying device comprising an optical gain equalizer in which a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges, and the one or more fiber gratings or dielectric multilayer filters compensate the ripple component remaining as the difference between the loss wavelength characteristic for gain flattening and the loss wavelength characteristic owing to the etalon filters; and first and second optical amplifiers for amplifying a wavelength division multiplexing light, and wherein the first optical amplifier is an optical semiconductor amplifier.

According to a forty-eighth aspect of the present invention, there is provided an optical amplifying device comprising an optical gain equalizer in which a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges, and have a sinusoidal wave loss characteristic of the same amplitude and period as those of the term obtained by Fourier series expansion of the loss wavelength characteristic for gain flattening, and the one or more fiber gratings or dielectric multilayer filters compensate the ripple component remaining as the difference between the loss wavelength characteristic for gain flattening and the loss wavelength characteristic owing to the etalon filters; and first and second optical amplifiers for amplifying a wavelength division multiplexing light, and wherein the first optical amplifier is an optical semiconductor amplifier.

According to a forty-ninth aspect of the present invention, there is provided an optical amplifying device comprising an optical gain equalizer in which a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges; and first and second optical amplifiers for amplifying a wavelength division multiplexing light, and wherein the optical gain equalizer is arranged between the first and second optical amplifiers and the first optical amplifier is an optical semiconductor amplifier.

According to a fiftieth aspect of the present invention, there is provided an optical amplifying device comprising an optical gain equalizer in which a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges, and have a sinusoidal wave loss characteristic of the same amplitude and period as those of the term obtained by Fourier series expansion of the loss wavelength characteristic for gain flattening; and first and second optical amplifiers for amplifying a wavelength division multiplexing light, and wherein the optical gain equalizer is arranged between the first and second optical amplifiers and the first optical amplifier is an optical semiconductor amplifier.

According to a fifty-first aspect of the present invention, there is provided an optical amplifying device comprising an optical gain equalizer in which a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges, and the one or more fiber gratings or dielectric multilayer filters compensate the ripple component remaining as the difference between the loss wavelength characteristic for gain flattening and the loss wavelength characteristic owing to the etalon filters; and first and second optical amplifiers for amplifying a wavelength division multiplexing light, and wherein the optical gain equalizer is arranged between the first and second optical amplifiers and the first optical amplifier is an optical semiconductor amplifier.

According to a fifty-second aspect of the present invention, there is provided an optical amplifying device comprising an optical gain equalizer in which a plurality of etalon filters and one or more fiber gratings or dielectric multilayer filters are arranged in cascade, and a beam of light externally applied is passed through the etalon filters and the one or more fiber gratings or dielectric multilayer filters and outputted to the outside, and the etalon filters have different free spectrum ranges, and have a sinusoidal wave loss characteristic of the same amplitude and period as those of the term obtained by Fourier series expansion of the loss wavelength characteristic for gain flattening, and the one or more fiber gratings or dielectric multilayer filters compensate the ripple component remaining as the difference between the loss wavelength characteristic for gain flattening and the loss wavelength characteristic owing to the etalon filters; and first and second optical amplifiers for amplifying a wavelength division multiplexing light, and wherein the optical gain equalizer is arranged between the first and second optical amplifiers and the first optical amplifier is an optical semiconductor amplifier.

According to a fifty-third aspect of the present invention, there is provided a wavelength division multiplex transmitter comprising a light sending device 10 including a light sending portion 7 for sending a plurality of signal lights having different wavelengths, and a light combining device 9 for outputting a wavelength division multiplexing light obtained by combining the plurality of signal lights to one end of an optical transmitting path 8; a light receiving device 13 including a light dividing device 11 for dividing the wavelength division multiplexing light outputted from the other end of the optical transmitting path 8 into signal lights for each wavelength, and a light receiving portion 12 for converting the divided signal lights into respective electrical signals; and one or more optical amplifying devices 14 disposed between the light sending device 10 and the light receiving device 13 and adapted to amplify the wavelength division multiplexing light propagated through the optical transmitting path 8, and wherein the optical amplifying device 14 is an optical amplifying device according to any one of fifth to fifty-second aspects.

BRIEF DESCRIPTION OF THE DRAWINGS

FIGS. 3A to 3C are schematic views showing other embodiments of an optical amplifying device according to the present invention;

FIG. 4 is a schematic view showing a wavelength-division multiplex transmitter according to an embodiment of the present invention;

BEST MODES FOR CARRYING OUT THE INVENTION (Principle of Optical Gain Equalizer)

Figure 5A:
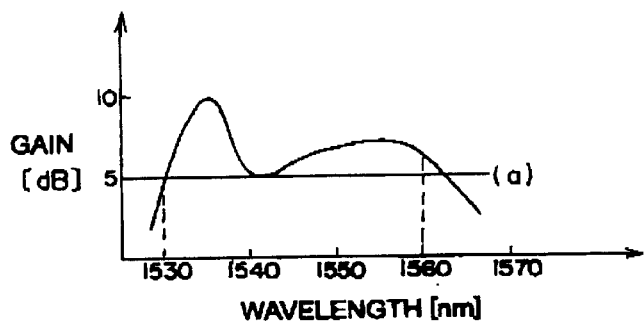
FIGS. 5A to 5C are explanatory views for explaining elimination of wavelength dependency of gain attained by etalon filters.

First of all, a principle of an optical gain equalizer according to the present invention will be explained. FIG. 5A shows a gain characteristic of an ordinary erbium doped optical-fiber amplifier (referred to merely as "optical amplifier" hereinafter), and the principle will be explained with reference to an example that such a gain characteristic is flattened in a band having a wavelength from 1530 nm to 1560 nm which is used in wavelength-division multiplexed (WDM) communication.

Figure 5B:
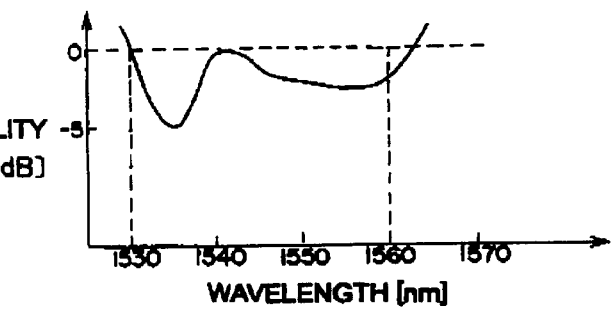

In FIG. 5A, in order to flatten gain wavelength dependency the wavelength band used, loss for cancelling a gain portion greater than a level shown by the line (a) in FIG. 5A may be created, and, more particularly, a loss wavelength characteristic shown in FIG. 5B may be created.

A curve representing the loss wavelength characteristic shown in FIG. 5B can be represented by Fourier series mathematically, and, accordingly, as described in connection with the related background art, by combining etalon filters having a sinusoidal wave loss characteristic of the same amplitude and period as those of the term obtained by the Fourier series expansion, the same loss wavelength characteristic as shown in FIG. 5B can be created.

In this case, the etalon filters to be combined have different free spectrum ranges (FSR). Incidentally, here, the free spectrum range means a wavelength period or distance between minimum values of the permeation loss. The free spectrum range depends upon a thickness and index of refraction of etalon and can be represented as follows, when it is assumed that the thickness of etalon is d[m], the index of refraction of a substrate used to etalon is n [m] and velocity of light is c [m/s] and that the light is incident at an incident angle θ[deg]:

$$c/(2nd\sqrt{1-\sin^2\theta/n^2})$$

Figure 9:
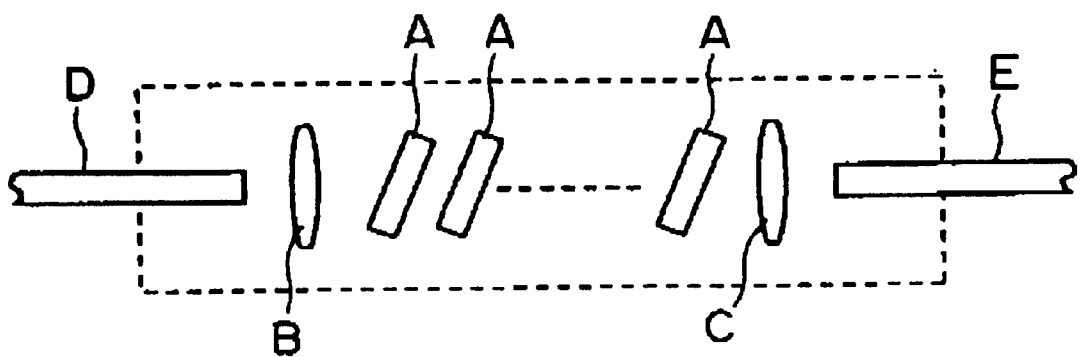
FIG. 9 is a schematic view showing an example of a conventional optical gain equalizer obtained by combination of etalon filters.

Now, it is considered to flatten the gain by using combination of the etalon filters based on the above-mentioned principle. In consideration of manufacturing viewpoint and total permeation loss, an optical gain equalizer comprised of combination of four etalon filters is formed (refer to an optical gain equalizer shown in FIG. 9). A curve shown by the broken line in FIG. 5C indicates the optical gain characteristic of the optical fiber amplifier when the light is passed through this optical gain equalizer.

As shown, in the combination of four etalon filters, it can be seen that the ripple component remains in the gain characteristic and perfect compensation cannot be achieved. In order to compensate the ripple component, according to the above-mentioned principle, five or more etalon filters are required. However, in actual, it is very difficult to combine five or more etalon filters in consideration of manufacturing viewpoint and total permeation loss.

Figure 6:
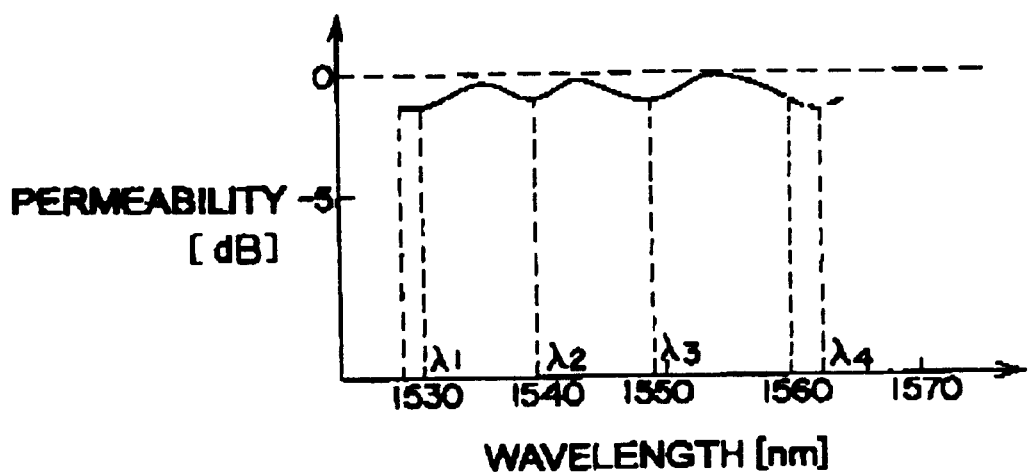
FIG. 6 is an explanatory view showing permeation characteristic for flattening ripple component.
Figure 7A:
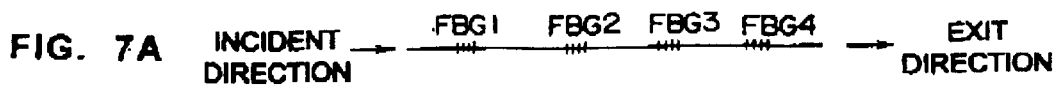
FIG. 7A is a schematic view showing the fiber gratings.
Figure 7B:
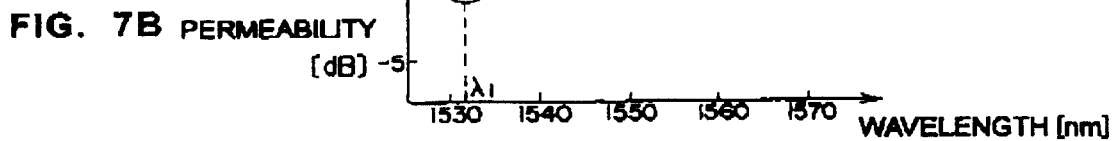
FIGS. 7B to 7F are explanatory views showing a principle for realizing loss characteristic in FIG. 6 by using the fiber gratings.
Figure 7C:
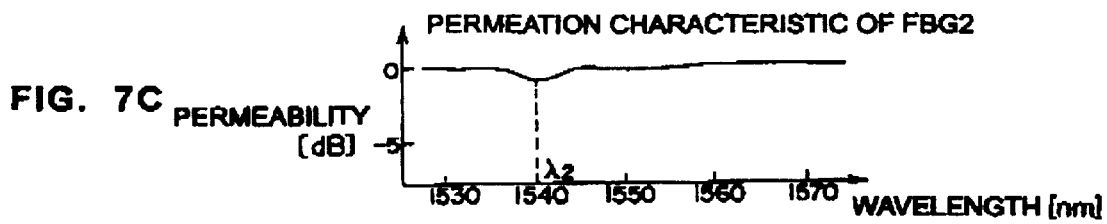
Figure 7D:
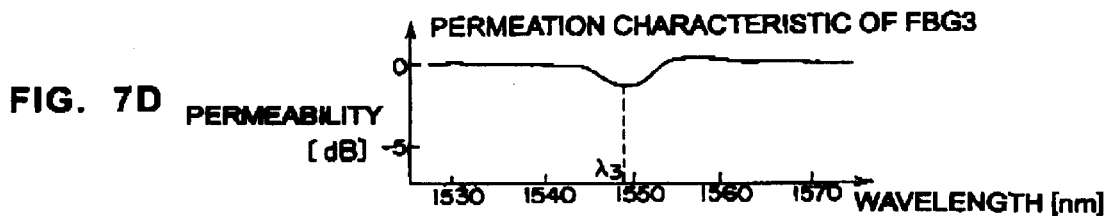
Figure 7E:
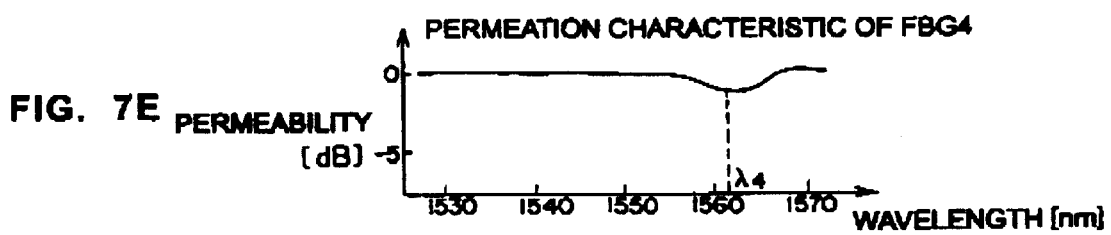
Figure 7F:
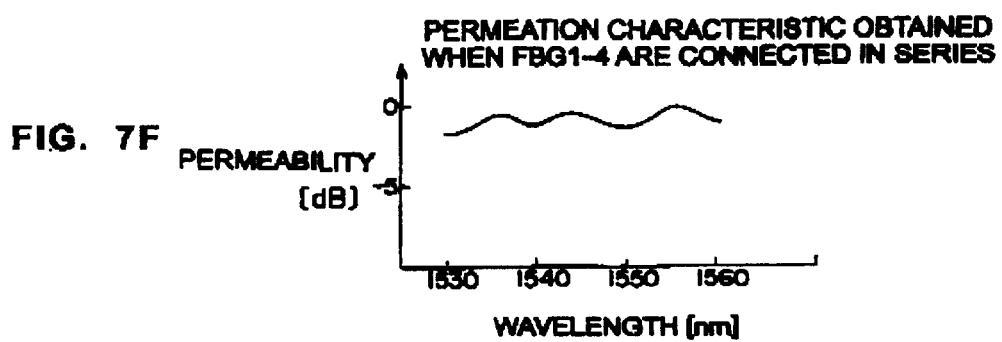

More specifically, as shown in FIG. 6, the ripple component is non-periodical factor having maximum values of loss in wavelengths $\lambda_{-1}$, $\lambda_{-2}$, $\lambda_{-3}$, $\lambda_{-4}$, i.e., non-periodical factor having minimum values of permeability in wavelengths $\lambda_{-1}$, $\lambda_{-2}$, $\lambda_{-3}$, $\lambda_{-4}$, and, thus, by adding an optical element having such loss characteristic to the optical gain equalizer comprised of the etalon filters, the ripple component ought to be eliminated.

Figure 5C:
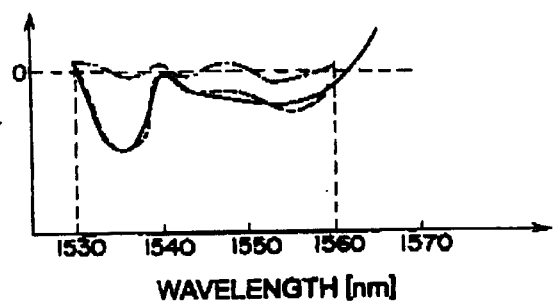

Thus, in the present invention, as optical elements for eliminating the ripple component, fiber gratings or dielectric multilayer filters are used to eliminate the ripple component shown by the broken line in FIG. 5C. That is to say, the loss wavelength characteristic shown in FIG. 6 is created to eliminate the ripple component.

Figure 8:
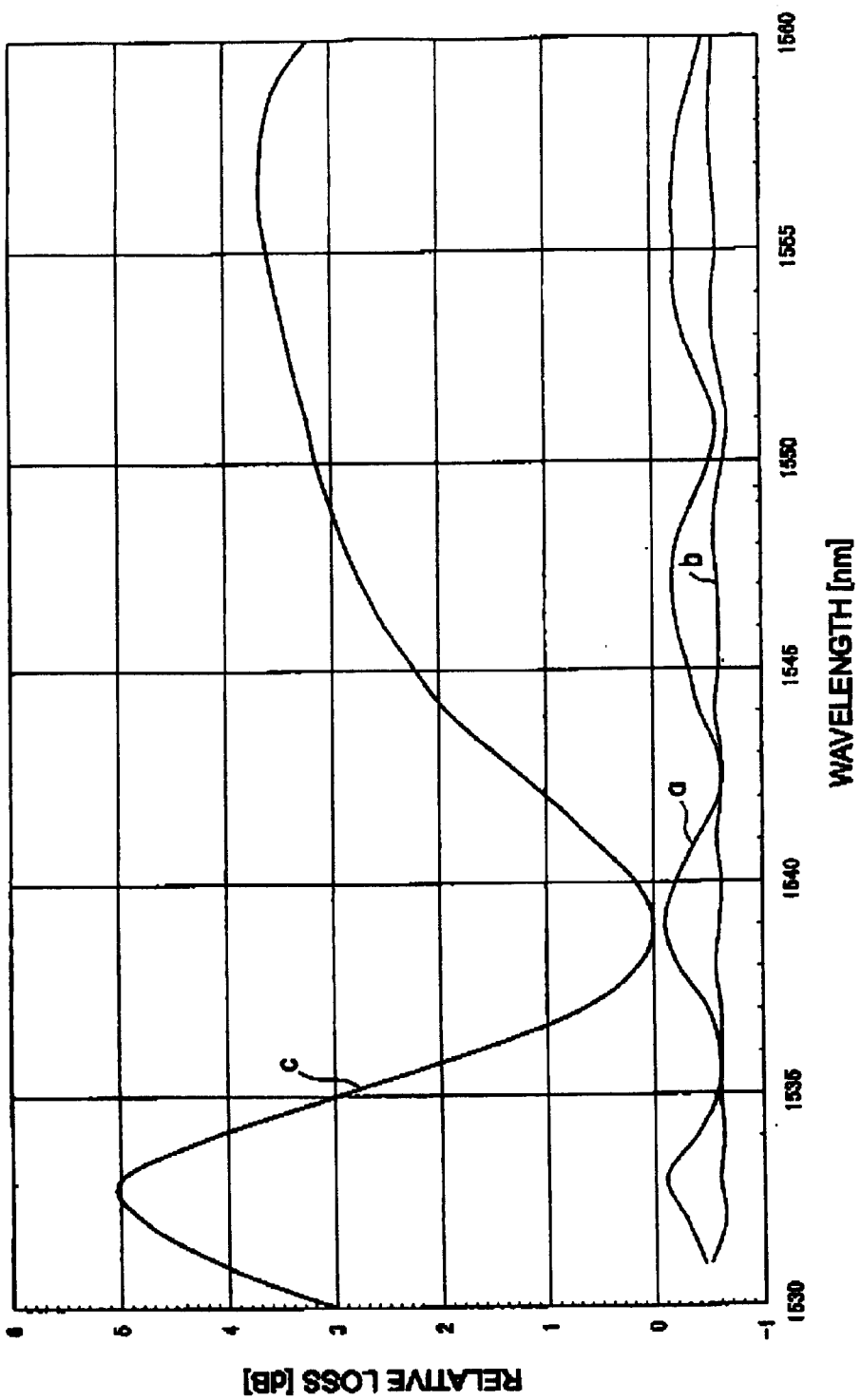
FIG. 8 is an explanatory view showing the difference between elimination of wavelength dependency achieved by combination of etalon filters and elimination of wavelength dependency achieved by combination of etalon filters and fiber gratings.

For example, the fiber grating has loss characteristic having abrupt peak in a particular wavelength, so that, although it is difficult to eliminate the gain wavelength dependency of the optical amplifier in place of the etalon filter, the loss characteristic having mountain-like peaks shown in FIG. 6 can be created relatively easily. In consideration of this, the loss wavelength characteristic shown in FIG. 6 is decomposed into four loss wavelength characteristics shown in FIGS. 7B to 7E, and fiber gratings (FBG1, FBG2, FBG3, FBG4) having such loss characteristics shown in FIGS. 7B to 7E, respectively are formed, and these fiber gratings are connected in series as shown in FIG. 7. These fiber gratings (FBG1, FBG2, FBG3, FBG4) have a loss wavelength characteristic shown in FIG. 7F in total, i.e., the loss wavelength characteristic shown in FIG. 6. By combining these fiber gratings with the above-mentioned four etalon filters, the ripple component shown in FIG. 5C can be eliminated and the optical gain equalizer according to the present invention can be provided. FIG. 8 represents a gain wavelength characteristic c owing to the EDFA, a gain wavelength characteristic a of the gain equalizer obtained by combining only four etalon filters, and a gain wavelength characteristic b of the gain equalizer obtained by combining the fiber gratings with the four etalon filters and thus indicates the difference in performance between the gain equalizer obtained by combining only the etalon filters and the gain equalizer obtained by combining the fiber gratings with the etalon filters.

Also when the dielectric multilayer filters are used, although it is difficult to eliminate the gain wavelength dependency of the optical amplifier in place of the etalon filter, the loss characteristic having mountain-like peaks shown in FIG. 6 can be created relatively easily. Thus, by combining these dielectric multilayer filters with the etalon filters to constitute an optical gain equalizer, the ripple component shown in FIG. 5C can be eliminated and the optical gain equalizer according to the present invention can be provided.

In the optical gain equalizer according to the present invention, not only the loss wavelength characteristic can be adjusted by adjusting the incident angle of light to the etalon filters as is in the conventional optical gain equalizer obtained by combining the etalon filters, but also the remaining ripple component which could not compensated by the etalon filters can be eliminated by the fiber gratings or the dielectric multilayer fibers having the same function.

Further, in this optical gain equalizer, when a thickness of the substrate is designed to a proper value so that the incident angle of light to the etalon filters approaches to zero, polarization dependency of loss can be reduced. And, when the fiber gratings are used, the polarization dependency can be eliminated by forming the gratings in a direction perpendicular to a light propagating direction, and, when the dielectric multilayer filters are used, the polarization dependency can be reduced due to the same principle as that of the etalon filter.

Furthermore, regarding the etalon filters and the dielectric multilayer filters, fluctuation in loss characteristic due to change in temperature can be reduced to 0.004 nm/K, and, regarding the fiber gratings, the fluctuation in loss characteristic due to change in temperature can substantially be eliminated by a temperature compensating package. For these reasons, performance of the optical gain equalizer according to the present invention can be achieved stably even if the environmental temperature is changed.

(Embodiment of optical gain equalizer)

Next, an embodiment of the optical gain equalizer according to the present invention will be explained with reference to FIG. 1. Optical fibers 20, 23 are connected to (light) input and output ports of an optical gain equalizer 4, and these two optical fibers 20, 23 are optically coupled together by a collimated beam through lenses 21, 22 provided near ends of the optical fibers.

Four etalon filters 1 designed on the basis of the above-mentioned principle are interposed between the lenses 21 and 22. A loss maximum value, a loss minimum value, a free spectrum range and finesse of each etalon filter 1 are determined by Fourier series expansion of the gain wavelength characteristic of a transmission system to which the optical gain equalizer is applied.

On the way of the optical fiber 23, fiber gratings 2 (FBG1, FBG2, FBG3, FBG4) designed on the basis of the above-mentioned principle are provided. That is to say, the fiber gratings 2 (FBG1, FBG2, FBG3, FBG4) designed to eliminate the remaining ripple component which could not compensated by the combination of only four etalon filters 1 are inserted. The fiber gratings 2 (FBG1, FBG2, FBG3, FBG4) are designed so that they can compensate fluctuation in characteristic value due to change in temperature by using a temperature compensating package 24. Incidentally, the fiber gratings 2 (FBG1, FBG2, FBG3, FBG4) may be provided on the way of the optical fiber 20.

Figure 2:
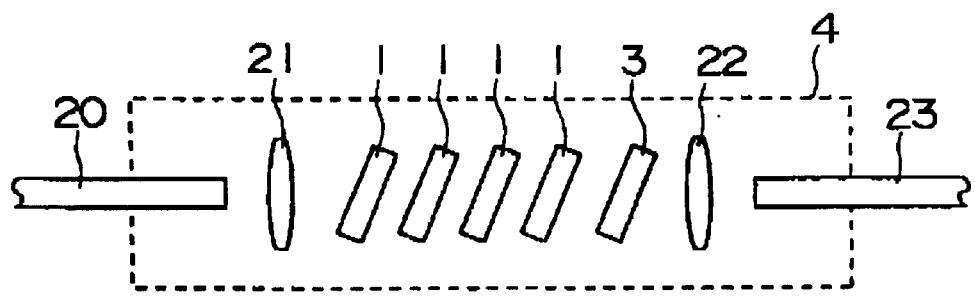
FIG. 2 is a schematic view showing an optical gain equalizer according to another embodiment of the present invention, in which dielectric multilayer filters are used.

The optical gain equalizer according to the present invention can be constituted by using a dielectric multilayer filter 3 in place of the above-mentioned fiber gratings 2 (FBG1, FBG2, FBG3, FBG4), as shown in FIG. 2. The dielectric multilayer filter 3 can be disposed at a desired position between the lenses 21 and 22. The arrangement of the etalon filters 1 and the dielectric multilayer filter 3 can be selected optionally. When the dielectric multilayer filter 3 is used, the dielectric multilayer filter must have a function capable of eliminating the remaining ripple component which could not compensated by the combination of only the etalon filters 1.

(Embodiments of optical amplifier or optical amplifying device)

Next, embodiments of an optical amplifier (optical amplifying device) according to the present invention will be explained with reference to FIG. 3. FIG. 3A shows an optical amplifying device constituted by connecting the optical gain equalizer 4 shown in FIG. 1 or FIG. 2 to an output end of an optical amplifier 5 including an optical fiber amplifier or an optical semiconductor amplifier. In this case, wavelength dependency of gain of the optical amplifier 5 is evaluated, and, by designing the optical gain equalizer 4 so as to eliminate the gain wavelength dependency, the wavelength dependency of gain can be eliminated in total.

Figure 1:
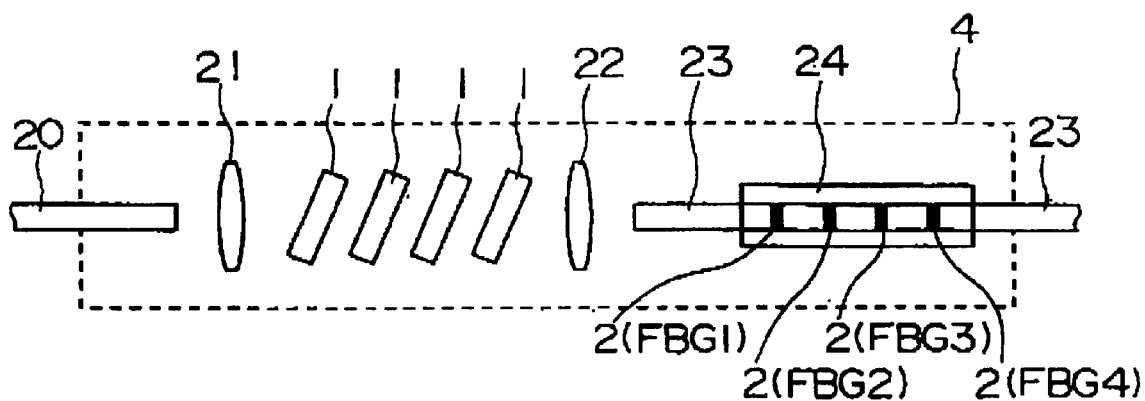
FIG. 1 is a schematic view showing an optical gain equalizer according to an embodiment of the present invention, in which fiber gratings are used.

FIG. 3B shows an optical amplifying device constituted by connecting the optical gain equalizer 4 shown in FIG. 1 or FIG. 2 to an input end of an optical amplifier 5 including an optical fiber amplifier or an optical semiconductor amplifier. Also in this case, wavelength dependency of gain of the optical amplifier 5 is evaluated, and, by designing the optical gain equalizer 4 so as to eliminate the gain wavelength dependency, the wavelength dependency of gain can be eliminated in total.

FIG. 3C shows an example of a second amplifying device having two optical amplifiers 5, 6. In this case, the optical gain equalizer 4 may be disposed between these amplifiers 5 and 6. Further, in this case, total gain characteristic of two amplifiers 5, 6 is evaluated, and, by designing the optical gain equalizer 4 so as to eliminate the gain wavelength dependency, the wavelength dependency of gain can be eliminated in total.

In the optical amplifying devices shown in FIGS. 3A to 3C, if there is wavelength dependency in a transmission system to which the optical amplifying device is connected or in transmission paths other than the gain wavelength characteristics of the optical amplifiers 5, 6 in the amplifying device, by evaluating such characteristic, such dependency can be eliminated by the optical gain equalizer according to the present invention.

(Embodiment of wavelength-division multiplex transmitter)

Next, an embodiment of a wavelength-division multiplex transmitter according to the present invention will be explained with reference to FIG. 4. A single light sending device 10 is constituted by a plurality of light sending portions 7 and a light combining device 9. The light sending portions 7 serve to output light signals modulated by externally applied electrical signals and to emit signal lights having different wavelengths. The optical coupler (light combining device) 9 serves to combine the signal lights outputted from the plurality of light sending portions 7 to create a wavelength division multiplexing light which is in turn outputted to one end of an optical transmission path 8. On the other hand, a single light receiving device 13 is constituted by a plurality of light receiving portions 12 and a light dividing device 11. The optical coupler (light dividing device) 11 serves to divide the wavelength division multiplexing light outputted from the other end of the optical transmission path 8 into signal lights for every wavelength which are in turn outputted to the light receiving portions 12. Each light receiving portion 12 demodulates the received signal light into an electrical signal. One or more optical amplifying devices 14 capable of amplifying the wavelength division multiplexing light are provided in the transmission path 8 between the light sending device 10 and the light receiving device 13. Each optical amplifying device 14 is an optical amplifier 14 incorporating therein the optical gain equalizer 4 shown in FIGS. 3A, 3B or 3C. When the system has two or more optical amplifying devices 14, although its is desirable that all of the optical amplifying devices 14 incorporate therein the optical gain equalizers, respectively, the optical gain equalizers may be incorporated into particular optical amplifying devices 14 and gain wavelength dependencies of the remaining optical amplifying devices 14 which do not incorporate the respective optical gain equalizers may be eliminated by the optical gain equalizers 4 incorporated into the other optical amplifying devices 14.

Availability in Industry

In the optical gain equalizer according to the present invention, since the fiber gratings or the dielectric multilayer filters are combined with the plurality of etalon filters so that the ripple component which could not be eliminated by the combination of only the etalon filters the combined number of which is limited is eliminated by the fiber gratings or the dielectric multilayer filters, the gain wavelength dependency of the optical amplifier can be flattened substantially completely (up to 0.1 dB or less) while maintaining the practical construction.

Regarding the optical amplifying device according to the present invention, the gain wavelength dependency of the optical amplifying device can be flattened to 0.1 dB or less by combining it with the aforementioned optical gain equalizer, and more greater number of optical amplifying devices than that in the conventional cases can be connected in a multi stage fashion.

Regarding the wavelength-division multiplex transmitter according to the present invention, since the optical amplifying device having less gain wavelength dependency is used to relay the wavelength division multiplexing light, the transmission distance can be lengthened and quality of communication can be improved.

What is claimed is:

1. An optical gain equalizer wherein:
a plurality of etalon filters and one or more fiber gratings or dielectric multilayer filters are arranged in cascade;
a beam of light externally applied is passed through said etalon filters and said fiber gratings or said dielectric multilayer filters and outputted to the outside; and
said etalon filters have different free spectrum ranges.

2. An optical gain equalizer wherein:
a plurality of etalon filters and one or more fiber gratings or dielectric multilayer filters are arranged in cascade;
a beam of light externally applied is passed through said etalon filters and said one or more fiber gratings or dielectric multilayer filters and outputted to the outside;
said etalon filters have different free spectrum ranges, and have a sinusoidal wave loss characteristic of the same amplitude and period as those of the term obtained by Fourier series expansion of the loss wavelength characteristic for gain flattening.

3. An optical gain equalizer wherein:
a plurality of etalon filters and one or more fiber gratings or dielectric multilayer filters are arranged in cascade;
a beam of light externally applied is passed through said etalon filters and said one or more fiber gratings or dielectric multilayer filters and outputted to the outside;
said etalon filters have different free spectrum ranges; and
said one or more fiber gratings or dielectric multilayer filters compensate the ripple component remaining as the difference between the loss wavelength characteristic for gain flattening and the loss wavelength characteristic owing to said etalon filters.

4. An optical gain equalizer wherein:
a plurality of etalon filters and one or more fiber gratings or dielectric multilayer filters are arranged in cascade;
a beam of light externally applied is passed through said etalon filters and said one or more fiber gratings or dielectric multilayer filters and outputted to the outside;
said etalon filters have different free spectrum ranges, and have a sinusoidal wave loss characteristic of the same amplitude and period as those of the term obtained by Fourier series expansion of the loss wavelength characteristic for gain flattening; and
said one or more fiber gratings or dielectric multilayer filters compensate the ripple component remaining as the difference between the loss wavelength characteristic for gain flattening and the loss wavelength characteristic owing to said etalon filters.

5. An optical amplifying device comprising:
an optical gain equalizer in which a plurality of etalon filters and one or more fiber gratings or dielectric multilayer filters are arranged in cascade, and a beam of light externally applied is passed through said etalon filters and said one or more fiber gratings or dielectric multilayer filters and outputted to the outside, and said etalon filters have different free spectrum ranges; and
a first optical amplifier for amplifying a wavelength division multiplexing light.

6. An optical amplifying device comprising:
an optical gain equalizer in which a plurality of etalon filters and one or more fiber gratings or dielectric multilayer filters are arranged in cascade, and a beam of light externally applied is passed through said etalon filters and said one or more fiber gratings or dielectric multilayer filters and outputted to the outside, and said etalon filters have different free spectrum ranges, and have a sinusoidal wave loss characteristic of the same amplitude and period as those of the term obtained by Fourier series expansion of the loss wavelength characteristic for gain flattening; and
a first optical amplifier for amplifying a wavelength division multiplexing light.

7. An optical amplifying device comprising:
an optical gain equalizer in which a plurality of etalon filters and one or more fiber gratings or dielectric multilayer filters are arranged in cascade, and a beam of light externally applied is passed through said etalon filters and said one or more fiber gratings or dielectric multilayer filters and outputted to the outside, and said etalon filters have different free spectrum ranges, and said one or more fiber gratings or dielectric multilayer filters compensate the ripple component remaining as the difference between the loss wavelength characteristic for gain flattening and the loss wavelength characteristic owing to said etalon filters; and
a first optical amplifier for amplifying a wavelength division multiplexing light.

8. An optical amplifying device comprising:
an optical gain equalizer in which a plurality of etalon filters and one or more fiber gratings or dielectric multilayer filters are arranged in cascade, and a beam of light externally applied is passed through said etalon filters and said one or more fiber gratings or dielectric multilayer filters an outputted to the outside, and said etalon filters have different free spectrum ranges, and have a sinusoidal wave loss characteristic of the same amplitude and period as those of the term obtained by Fourier series expansion of the loss wavelength characteristic for gain flattening, and said one or more fiber gratings or dielectric multilayer filters compensate the ripple component remaining as the difference between the loss wavelength characteristic for gain flattening and the loss wavelength characteristic owing to said etalon filters; and
a first optical amplifier for amplifying a wavelength division multiplexing light.

9. An optical amplifying device comprising:
an optical gain equalizer in which a plurality of etalon filters and one or more fiber gratings or dielectric multilayer filters are arranged in cascade, and a beam of light externally applied is passed through said etalon filters and said one or more fiber gratings or dielectric multilayer filters and outputted to the outside, and said etalon filters have different free spectrum ranges; and
a first optical amplifier for amplifying a wavelength division multiplexing light; and wherein
said optical gain equalizer is arranged before or after said first optical amplifier.

10. An optical amplifying device comprising:
an optical gain equalizer in which a plurality of etalon filters and one or more fiber gratings or dielectric multilayer filters are arranged in cascade, and a beam of light externally applied is passed through said etalon filters and said one or more fiber gratings or dielectric multilayer filters and outputted to the outside, and said etalon filters have different free spectrum ranges, and have a sinusoidal wave loss characteristic of the same amplitude and period as those of the term obtained by Fourier series expansion of the loss wavelength characteristic for gain flattening; and a first optical amplifier for amplifying a wavelength division multiplexing light; and wherein said optical gain equalizer is arranged before or after said first optical amplifier.

11. An optical amplifying device comprising:

an optical gain equalizer in which a plurality of etalon filters and one or more fiber gratings or dielectric multilayer filters are arranged in cascade, and a beam of light externally applied is passed through said etalon filters and said one or more fiber gratings or dielectric multilayer filters and outputted to the outside, and said etalon filters have different free spectrum ranges, and said one or more fiber gratings or dielectric multilayer filters compensate the ripple component remaining as the difference between the loss wavelength characteristic for gain flattening and the loss wavelength characteristic owing to said etalon filters; and a first optical amplifier for amplifying a wavelength division multiplexing light; and wherein said optical gain equalizer is arranged before or after said first optical amplifier.

12. An optical amplifying device comprising:

an optical gain equalizer in which a plurality of etalon filters and one or more fiber gratings or dielectric multilayer filters are arranged in cascade, and a beam of light externally applied is passed through said etalon filters and said one or more fiber gratings or dielectric multilayer filters and outputted to the outside, and said etalon filters have different free spectrum ranges, and have a sinusoidal wave loss characteristic of the same amplitude and period as those of the term obtained by Fourier series expansion of the loss wavelength characteristic for gain flattening, and said one or more fiber gratings or dielectric multilayer filters compensate the ripple component remaining as the difference between the loss wavelength characteristic for gain flattening and the loss wavelength characteristic owing to said etalon filters; and a first optical amplifier for amplifying a wavelength division multiplexing light; and wherein said optical gain equalizer is arranged before or after said first optical amplifier.

13. An optical amplifying device comprising:

an optical gain equalizer in which a plurality of etalon filters and one or more fiber gratings or dielectric multilayer filters are arranged in cascade, and a beam of light externally applied is passed through said etalon filters and said one or more fiber gratings or dielectric multilayer filters and outputted to the outside, and said etalon filters have different free spectrum ranges; and first and second optical amplifiers for amplifying a wavelength division multiplexing light.

14. An optical amplifying device comprising:

an optical gain equalizer in which a plurality of etalon filters and one or more fiber gratings or dielectric multilayer filters are arranged in cascade, and a beam of light externally applied is passed through said etalon filters and said one or more fiber gratings or dielectric multilayer filters and outputted to the outside, and said etalon filters have different free spectrum ranges, and have a sinusoidal wave loss characteristic of the same amplitude and period as those of the term obtained by Fourier series expansion of the loss wavelength characteristic for gain flattening; and first and second optical amplifiers for amplifying a wavelength division multiplexing light.

15. An optical amplifying device comprising:

an optical gain equalizer in which a plurality of etalon filters and one or more fiber gratings or dielectric multilayer filters are arranged in cascade, and a beam of light externally applied is passed through said etalon filters and said one or more fiber gratings or dielectric multilayer filters and outputted to the outside, and said etalon filters have different free spectrum ranges, and said one or more fiber gratings or dielectric multilayer filters compensate the ripple component remaining as the difference between the loss wavelength characteristic for gain flattening and the loss wavelength characteristic owing to said etalon filters; and first and second optical amplifiers for amplifying a wavelength division multiplexing light.

16. An optical amplifying device comprising:

an optical gain equalizer in which a plurality of etalon filters and one or more fiber gratings or dielectric multilayer filters are arranged in cascade, and a beam of light externally applied is passed through said etalon filters and said one or more fiber gratings or dielectric multilayer filters and outputted to the outside, and said etalon filters have different free spectrum ranges, and have a sinusoidal wave loss characteristic of the same amplitude and a period as those of the term obtained by Fourier series expansion of the loss wavelength characteristic for gain flattening, and said one or more fiber gratings or dielectric multilayer filters compensate the ripple component remaining as the difference between the loss wavelength characteristic for gain flattening and the loss wavelength characteristic owing to said etalon filters; and first and second optical amplifiers for amplifying a wavelength division multiplexing light.

17. An optical amplifying device comprising:

an optical gain equalizer in which a plurality of etalon filters and one or more fiber gratings or dielectric multilayer filters are arranged in cascade, and a beam of light externally applied is passed through said etalon filters and said one or more fiber gratings or dielectric multilayer filters and outputted to the outside, and said etalon filters have different free spectrum ranges; and first and second optical amplifiers for amplifying a wavelength division multiplexing light; and wherein said optical gain equalizer is arranged between said first and second optical amplifiers.

18. An optical amplifying device comprising:

an optical gain equalizer in which a plurality of etalon filters and one or more fiber gratings or dielectric multilayer filters are arranged in cascade, and a beam of light externally applied is passed through said etalon filters and said one or more fiber gratings or dielectric multilayer filters and outputted to the outside, and said etalon filters have different free spectrum ranges, and have a sinusoidal wave loss characteristic of the same amplitude and period as those of the term obtained by Fourier series expansion of the loss wavelength characteristic for gain flattening; and first and second optical amplifiers for amplifying a wavelength division multiplexing light; and wherein
said optical gain equalizer is arranged between said first and second optical amplifiers.

19. An optical amplifying device comprising:
an optical gain equalizer in which a plurality of etalon filters and one or more fiber gratings or dielectric multilayer filters are arranged in cascade, and a beam of light externally applied is passed through said etalon filters and said one or more fiber gratings or dielectric multilayer filters and outputted to the outside, and said etalon filters have different free spectrum ranges, and said one or more fiber gratings or dielectric multilayer filters compensate the ripple component remaining as the difference between the loss wavelength characteristic for gain flattening and the loss wavelength characteristic owing to said etalon filters; and
first and second optical amplifiers for amplifying a wavelength division multiplexing light; and wherein
said optical gain equalizer is arranged between said first and second optical amplifiers.

20. An optical amplifying device comprising:
an optical gain equalizer in which a plurality of etalon filters and one or more fiber gratings or dielectric multilayer filters are arranged in cascade, and a beam of light externally applied is passed through said etalon filters and said one or more fiber gratings or dielectric multilayer filters and outputted to the outside, and said etalon filters have different free spectrum ranges, and have a sinusoidal wave loss characteristic of the same amplitude and period as those of the term obtained by Fourier series expansion of the loss wavelength characteristic for gain flattening, and said one or more fiber gratings or dielectric multilayer filters compensate the ripple component remaining as the difference between the loss wavelength characteristic for gain flattening and the loss wavelength characteristic owing to said etalon filters; and
first and second optical amplifiers for amplifying a wavelength division multiplexing light; and wherein
said optical gain equalizer is arranged between said first and second optical amplifiers.

21. An optical amplifying device comprising:
an optical gain equalizer in which a plurality of etalon filters and one or more fiber gratings or dielectric multilayer filters are arranged in cascade, and a beam of light externally applied is passed through said etalon filters and said one or more fiber gratings or dielectric multilayer filters and outputted to the outside, and said etalon filters have different free spectrum ranges; and
first and second optical amplifiers for amplifying a wavelength division multiplexing light; and wherein
said first optical amplifier is an optical fiber amplifier.

22. An optical amplifying device comprising:
an optical gain equalizer in which a plurality of etalon filters and one or more fiber gratings or dielectric multilayer filters are arranged in cascade, and a beam of light externally applied is passed through said etalon filters and said one or more fiber gratings or dielectric multilayer filters and outputted to the outside, and said etalon filters have different free spectrum ranges, and have a sinusoidal wave loss characteristic of the same amplitude and period as those of the term obtained by Fourier series expansion of the loss wavelength characteristic for gain flattening; and
a first optical amplifier for amplifying a wavelength division multiplexing light; and wherein
said first optical amplifier is an optical fiber amplifier.

23. An optical amplifying device comprising:
an optical gain equalizer in which a plurality of etalon filters and one or more fiber gratings or dielectric multilayer filters are arranged in cascade, and a beam of light externally applied is passed through said etalon filters and said one or more fiber gratings or dielectric multilayer filters and outputted to the outside, and said etalon filters have different free spectrum ranges, and said one or more fiber gratings or dielectric multilayer filters compensate the ripple component remaining as the difference between the loss wavelength characteristic for gain flattening and the loss wavelength characteristic owing to said etalon filters; and
a first optical amplifier for amplifying a wavelength division multiplexing light; and wherein
said first optical amplifier is an optical fiber amplifier.

24. An optical amplifying device comprising:
an optical gain equalizer in which a plurality of etalon filters and one or more fiber gratings or dielectric multilayer filters are arranged in cascade, and a beam of light externally applied is passed through said etalon filters and said one or more fiber gratings or dielectric multilayer filters and outputted to the outside, and said etalon filters have different free spectrum ranges, and have a sinusoidal wave loss characteristic of the same amplitude and period as those of the term obtain by Fourier series expansion of the loss wavelength characteristic for gain flattening, and said one or more fiber gratings or dielectric multilayer filters compensate the ripple component remaining as the difference between the loss wavelength characteristic for gain flattening and the loss wavelength characteristic owing to said etalon filters; and
a first optical amplifier for amplifying a wavelength division multiplexing light; and wherein
said first optical amplifier is an optical fiber amplifier.

25. An optical amplifying device comprising:
an optical gain equalizer in which a plurality of etalon filters and one or more fiber gratings or dielectric multilayer filters are arranged in cascade, and a beam of light externally applied is passed through said etalon filters and said one or more fiber gratings or dielectric multilayer filters and outputted to the outside, and said etalon filters have different free spectrum ranges; and
a first optical amplifier for amplifying a wavelength division multiplexing light; and wherein
said optical gain equalizer is arranged before or after said first optical amplifier and said first optical amplifier is an optical fiber amplifier.

26. An optical amplifying device comprising:
an optical gain equalizer in which a plurality of etalon filters and one or more fiber gratings or dielectric multilayer filters are arranged in cascade, and a beam of light externally applied is passed through said etalon filters and said one or more fiber gratings or dielectric multilayer filters and outputted to the outside, and said etalon filters have different free spectrum ranges, and have a sinusoidal wave loss characteristic of the same amplitude and period as those of the term obtained by Fourier series expansion of the loss wavelength characteristic for gain flattening; and
a first optical amplifier for amplifying a wavelength division multiplexing light; and wherein
said optical gain equalizer is arranged before or after said first optical amplifier and said first optical amplifier is an optical fiber amplifier.

27. An optical amplifying device comprising:
an optical gin equalizer in which a plurality of etalon filters and one or more fiber gratings or dielectric multilayer filters are arranged in cascade, and a beam of light externally applied is passed through said etalon filters and said one or more fiber gratings or dielectric multilayer filters and outputted to the outside, and said etalon filters have different free spectrum ranges, and said one or more fiber gratings or dielectric multilayer filters compensate the ripple component remaining as the difference between the loss wavelength characteristic for gain flattening and the loss wavelength characteristic owing to said etalon filters; and
a first optical amplifier for amplifying a wavelength division multiplexing light; and wherein
said optical gain equalizer is arranged before or after said first optical amplifier and said first optical amplifier is an optical fiber amplifier.

28. An optical amplifying device comprising:
an optical gain equalizer in which a plurality of etalon filters and one or more fiber gratings or dielectric multilayer filters are arranged in cascade, and a beam of light externally applied is passed through said etalon filters and said one or more fiber gratings or dielectric multilayer filters and outputted to the outside, and said etalon filters have different free spectrum ranges, and have a sinusoidal wave loss characteristic of the same amplitude and period as those of the term obtained by Fourier series expansion of the loss wavelength characteristic for gain flattening, and said one or more fiber gratings or dielectric multilayer filters compensate the ripple component remaining as the difference between the loss wavelength characteristic for gain flattening and the loss wavelength characteristic owing to said etalon filters; and
a first optical amplifier for amplifying a wavelength division multiplexing light; and wherein
said optical gain equalizer is arranged before or after said first optical amplifier and said first optical amplifier is an optical fiber amplifier.

29. An optical amplifying device comprising:
an optical gain equalizer in which a plurality of etalon filters and one or more fiber gratings or dielectric multilayer filters are arranged in cascade, and a beam of light externally applied is passed through said etalon filters and said one or more fiber gratings or dielectric multilayer filters and outputted to the outside, and said etalon filters have different free spectrum ranges; and
first and second optical amplifiers for amplifying a wavelength division multiplexing light; and wherein
said first optical amplifier is an optical fiber amplifier.

30. An optical amplifying device comprising:
an optical gain equalizer in which a plurality of etalon filters and one or more fiber gratings or dielectric multilayer filters are arranged in cascade, and a beam of light externally applied is passed through said etalon filters and said one or more fiber gratings or dielectric multilayer filters and outputted to the outside, and said etalon filters have different free spectrum ranges, and have a sinusoidal wave loss characteristic of the same amplitude and period of those of the term obtained by Fourier series expansion of the loss wavelength characteristic for gain flattening; and
first and second optical amplifier for amplifying a wavelength division multiplexing light; and wherein
said first optical amplifier is an optical fiber amplifier.

31. An optical amplifying device comprising:
an optical gain equalizer in which a plurality of etalon filters and one or more fiber gratings or dielectric multilayer filters are arranged in cascade, and a beam of light externally applied is passed through said etalon filters and said one or more fiber gratings of dielectric multilayer filters and outputted to the outside, and said etalon filters have different free spectrum ranges, and said one or more fiber gratings or dielectric multilayer filters compensate the ripple component remaining as the difference between the loss wavelength characteristic for gain flattening and the loss wavelength characteristic owing to said etalon filters; and
first and second optical amplifiers for amplifying a wavelength division multiplexing light; and wherein
said first optical amplifier is an optical fiber amplifier.

32. An optical amplifying device comprising:
an optical gain equalizer in which a plurality of etalon filters and one or more fiber gratings or dielectric multilayer filters are arranged in cascade, and a beam of light externally applied is passed through said etalon filters and said one or more fiber gratings or dielectric multilayer filters and outputted to the outside, and said etalon filters have different free spectrum ranges, and have a sinusoidal wave loss characteristic of the same amplitude and period as those of the term obtained by Fourier series expansion of the loss wavelength characteristic for gain flattening, and said one or more fiber gratings or dielectric multilayer filters compensate the ripple component remaining as the difference between the loss wavelength characteristic for gain flattening and the loss wavelength characteristic owing to said etalon filters; and
first and second optical amplifiers for amplifying a wavelength division multiplexing light; and wherein
said first optical amplifier is an optical fiber amplifier.

33. An optical amplifying device comprising:
an optical gain equalizer in which a plurality of etalon filters and one or more fiber gratings or dielectric multilayer filters are arranged in cascade, and a beam of light externally applied is passed through said etalon filters and said one or more fiber gratings or dielectric multilayer filters and outputted to the outside, and said etalon filters have different free spectrum ranges; and
first and second optical amplifiers for amplifying a wavelength division multiplexing light; and wherein
said optical gain equalizer is arranged between said first and second optical amplifiers and said first optical amplifier is an optical fiber amplifier.

34. An optical amplifying device comprising:
an optical gain equalizer in which a plurality of etalon filters and one or more fiber gratings or dielectric multilayer filters are arranged in cascade, and a beam of light externally applied is passed through said etalon filters and said one or more fiber gratings or dielectric multilayer filters and outputted to the outside, and said etalon filters have different free spectrum ranges, and have a sinusoidal wave loss characteristic of the same amplitude and period as those of the term obtained by Fourier series expansion of the loss wavelength characteristic for gain flattening; and
first and second optical amplifiers for amplifying a wavelength division multiplexing light; and wherein
said optical gain equalizer is arranged between said first and second optical amplifiers and said first optical amplifier is an optical fiber amplifier.

35. An optical amplifying device comprising:
an optical gain equalizer in which a plurality of etalon filters and one or more fiber gratings or dielectric multilayer filters are arranged in cascade, and a beam of light externally applied is passed through said etalon filters and said one or more fiber gratings or dielectric multilayer filters and outputted to the outside, and said etalon filters have different free spectrum ranges, and said one or more fiber gratings or dielectric multilayer filters compensate the ripple component remaining as the difference between the loss wavelength characteristic for gain flattening and the loss wavelength characteristic owing to said etalon filters; and
first and second optical amplifiers for amplifying a wavelength division multiplexing light; and wherein
said optical gain equalizer is arranged between said first and second optical amplifiers and said first optical amplifier is an optical fiber amplifier.

36. An optical amplifying device comprising:
an optical gain equalizer in which a plurality of etalon filters and one or more fiber gratings or dielectric multilayer filters are arranged in cascade, and a beam of light externally applied is passed through said etalon filters and said one or more fiber gratings or dielectric multilayer filters and outputted to the outside, and said etalon filters have different free spectrum ranges, and have a sinusoidal wave loss characteristic of the same amplitude and period as those of the term obtained by Fourier series expansion of the loss wavelength characteristic for gain flattening, and said one or more fiber gratings or dielectric multilayer filters compensate the ripple component remaining as the difference between the loss wavelength characteristic for gain flattening and the loss wavelength characteristic owing to said etalon filters; and
first and second optical amplifiers for amplifying a wavelength division multiplexing light; and wherein
said optical gain equalizer is arranged between said first and second optical amplifiers and said first optical amplifier is an optical fiber amplifier.

37. An optical amplifying device comprising:
an optical gain equalizer in which a plurality of etalon filters and one or more fiber gratings or dielectric multilayer filters are arranged in cascade, and a beam of light externally applied is passed through said etalon filters and said one or more fiber gratings or dielectric multilayer filters and outputted to the outside, and said etalon filters have different free spectrum ranges; and
a first optical amplifier for amplifying a wavelength division multiplexing light; and wherein
said first optical amplifier is an optical semiconductor amplifier.

38. An optical amplifying device comprising:
an optical gain equalizer in which a plurality of etalon filters and one or more fiber gratings or dielectric multilayer filters are arranged in cascade, and a beam of light externally applied is passed through said etalon filters and said one or more fiber gratings or dielectric multilayer filters and outputted to the outside, and said etalon filters have different free spectrum ranges, and have a sinusoidal wave loss characteristic of the same amplitude and period as those of the term obtained by Fourier series expansion of the loss wavelength characteristic for gain flattening; and
a first optical amplifier for amplifying a wavelength division multiplexing light; and wherein
said first optical amplifier is an optical semiconductor amplifier.

39. An optical amplifying device comprising:
an optical gain equalizer in which a plurality of etalon filters and one or more fiber gratings or dielectric multilayer filters are arranged in cascade, and a beam of light externally applied is passed through said etalon filters and said one or more fiber gratings or dielectric multilayer filters and outputted to the outside, and said etalon filters have different free spectrum ranges, and said one or more fiber gratings or dielectric multilayer filters compensate the ripple component remaining as the difference between the loss wavelength characteristic for gain flattening and the loss wavelength characteristic owing to said etalon filters; and
a first optical amplifier for amplifying a wavelength division multiplexing light; and wherein
said first optical amplifier is an optical semiconductor amplifier.

40. An optical amplifying device comprising:
an optical gain equalizer in which a plurality of etalon filters and one or more fiber gratings or dielectric multilayer filters are arranged in cascade, and a beam of light externally applied is passed through said etalon filters and said one or more fiber gratings or dielectric multilayer filters and outputted to the outside, and said etalon filters have different free spectrum ranges, and have a sinusoidal wave loss characteristic of the same amplitude and period as those of the term obtained by Fourier series expansion of the loss wavelength characteristic for gain flattening, and said one or more fiber gratings or dielectric multilayer filters compensate the ripple component remaining as the difference between the loss wavelength characteristic for gain flattening and the loss wavelength characteristic owing to said etalon filters; and
a first optical amplifier for amplifying a wavelength division multiplexing light; and wherein
said first optical amplifier is an optical semiconductor amplifier.

41. An optical amplifying device comprising:
an optical gain equalizer in which a plurality of etalon filters and one or more fiber gratings or dielectric multilayer filters are arranged in cascade, and a beam of light externally applied is passed through said etalon filters and said one or more fiber gratings or dielectric multilayer filters and outputted to the outside, and said etalon filters have different free spectrum ranges; and
a first optical amplifier for amplifying a wavelength division multiplexing light: and wherein
said optical gain equalizer is arranged before or after said first optical amplifier and said first optical amplifier is an optical semiconductor amplifier.

42. An optical amplifying device comprising:
an optical gain equalizer in which a plurality of etalon filters and one or more fiber gratings or dielectric multilayer filters are arranged in cascade, and a beam of light externally applied is passed through said etalon filters and said one or more fiber gratings or dielectric multilayer filters and outputted to the outside, and said etalon filters have different free spectrum ranges, and have a sinusoidal wave loss characteristic of the same amplitude and period as those of the term obtained by Fourier series expansion of the loss wavelength characteristic for gain flattening; and
a first optical amplifier for amplifying a wavelength division multiplexing light; and wherein said optical gain equalizer is arranged before or after said first optical amplifier and said first optical amplifier is an optical semiconductor amplifier.

43. An optical amplifying device comprising:

an optical gain equalizer in which a plurality of etalon filters and one or more fiber gratings or dielectric multilayer filters are arranged in cascade, and a beam of light externally applied is passed through said etalon filters and said one or more fiber gratings or dielectric multilayer filters and outputted to the outside, and said etalon filters have different free spectrum ranges, and said one or more fiber gratings or dielectric multilayer filters compensate the ripple component remaining as the difference between the loss wavelength characteristic for gain flattening and the loss wavelength characteristic owing to said etalon filters; and a first optical amplifier for amplifying a wavelength division multiplexing light; and wherein
said optical gain equalizer is arranged before or after said first optical amplifier and said first optical amplifier is an optical semiconductor amplifier.

44. An optical amplifying device comprising:

an optical gain equalizer in which a plurality of etalon filters and one or more fiber gratings or dielectric multilayer filters are arranged in cascade, and a beam of light externally applied is passed through said etalon filters and said one or more fiber gratings or dielectric multilayer filters and outputted to the outside, and said etalon filters have different free spectrum ranges, and have a sinusoidal wave loss characteristic of the same amplitude and period as those of the term obtained by Fourier series expansion of the loss wavelength characteristic for gain flattening, and said one or more fiber gratings or dielectric multilayer filters compensate the ripple component remaining as the difference between the loss wavelength characteristic for gain flattening and the loss wavelength characteristic owing to said etalon filters; and a first optical amplifier for amplifying a wavelength division multiplexing light; and wherein
said optical gain equalizer is arranged before or after said first optical amplifier and said first optical amplifier is an optical semiconductor amplifier.

45. An optical amplifying device comprising:

an optical gain equalizer in which a plurality of etalon filters and one or more fiber gratings or dielectric multilayer filters are arranged in cascade, and a beam of light externally applied is passed through said etalon filters and said one or more fiber gratings or dielectric multilayer filters and outputted to the outside, and said etalon filters have different free spectrum ranges; and first and second optical amplifiers for amplifying a wavelength division multiplexing light; and wherein
said first optical amplifier is an optical semiconductor amplifier.

46. An optical amplifying device comprising:

an optical gain equalizer in which a plurality of etalon filters and one or more fiber gratings or dielectric multilayer filters are arranged in cascade, and a beam of light externally applied is passed through said etalon filters and said one or more fiber gratings or dielectric multilayer filters and outputted to the outside, and said etalon filters have different free spectrum ranges, and have a sinusoidal wave loss characteristic of the same amplitude and period as those of the term obtained by Fourier series expansion of the loss wavelength characteristic for gain flattening; and first and second optical amplifiers for amplifying a wavelength division multiplexing light; and wherein
said first optical amplifier is an optical semiconductor amplifier.

47. An optical amplifying device comprising:

an optical gain equalizer in which a plurality of etalon filters and one or more fiber gratings or dielectric multilayer filters are arranged in cascade, and a beam of light externally applied is passed through said etalon filters and said one or more fiber gratings or dielectric multilayer filters and outputted to the outside, and said etalon filters have different free spectrum ranges, and said one or more fiber gratings or dielectric multilayer filters compensate the ripple component remaining as the difference between the loss wavelength characteristic for gain flattening and the loss wavelength characteristic owing to said etalon filters; and first and second optical amplifiers for amplifying a wavelength division multiplexing light; and wherein
said first optical amplifier is an optical semiconductor amplifier.

48. An optical amplifying device comprising:

an optical gain equalizer in which a plurality of etalon filters and one or more fiber gratings or dielectric multilayer filters are arranged in cascade, and a beam of light externally applied is passed through said etalon filters and said one or more fiber gratings or dielectric multilayer filters and outputted to the outside, and said etalon filters have different free spectrum ranges, and have a sinusoidal wave loss characteristic of the same amplitude and period as those of the term obtained by Fourier series expansion of the loss wavelength characteristic for gain flattening, and said one or more fiber gratings or dielectric multilayer filters compensate the ripple component remaining as the difference between the loss wavelength characteristic for gain flattening and the loss wavelength characteristic owing to said etalon filters; and first and second optical amplifier for amplifying a wavelength division multiplexing light; and wherein
said first optical amplifier is an optical semiconductor amplifier.

49. An optical amplifying device comprising:

an optical gain equalizer in which a plurality of etalon filters and one or more fiber gratings or dielectric multilayer filters are arranged in cascade, and a beam of light externally applied is passed through said etalon filters and said one or more fiber gratings or dielectric multilayer filters and outputted to the outside, and said etalon filters have different free spectrum ranges; and first and second optical amplifiers for amplifying a wavelength division multiplexing light; and wherein
said optical gain equalizer is arranged between said first and second optical amplifiers and said first optical amplifier is an optical semiconductor amplifier.

50. An optical amplifying device comprising:

an optical gain equalizer in which a plurality of etalon filters and one or more fiber gratings or dielectric multilayer filters are arranged in cascade, and a beam of light externally applied is passed through said etalon filters and said one or more fiber gratings or dielectric multilayer filters and outputted to the outside, and said etalon filters have different free spectrum ranges, and have a sinusoidal wave loss characteristic of the same amplitude and period as those of the term obtained by Fourier series expansion of the loss wavelength characteristic for gain flattening; and first and second optical amplifiers for amplifying a wavelength division multiplexing light; and wherein
said optical gain equalizer is arranged between said first and second optical amplifiers and said first optical amplifier is an optical semiconductor amplifier.

51. An optical amplifying device comprising:

an optical gain equalizer in which a plurality of etalon filters and one or more fiber gratings or dielectric multilayer filters are arranged in cascade, and a beam of light externally applied is passed through said etalon filters and said one or more fiber gratings or dielectric multilayer filters and outputted to the outside, and said etalon filters have different free spectrum ranges, and said one or more fiber gratings or dielectric multilayer filters compensate the ripple component remaining as the difference between the loss wavelength characteristic for gain flattening and the loss wavelength characteristic owing to said etalon filters; and first and second optical amplifiers for amplifying a wavelength division multiplexing light; and wherein
said optical gain equalizer is arranged between said first and second optical amplifiers and said first optical amplifier is an optical semiconductor amplifier.

52. An optical amplifying device comprising:

an optical gain equalizer in which a plurality of etalon filters and one or more fiber gratings or dielectric multilayer filters are arranged in cascade, and a beam of light externally applied is passed through said etalon filters and said one or more fiber gratings or dielectric multilayer filters and outputted to the outside, and said etalon filters have different free spectrum ranges, and have a sinusoidal wave loss characteristic of the same amplitude and period as those of the term obtained by Fourier series expansion of the loss wavelength characteristic for gain flattening, and said one or more fiber gratings or dielectric multilayer filters compensate the ripple component remaining as the difference between the loss wavelength characteristic for gain flattening and the loss wavelength characteristic owing to said etalon filters; and first and second optical amplifiers for amplifying a wavelength division multiplexing light; and wherein
said optical gain equalizer is arranged between said first and second optical amplifiers and said first optical amplifier is an optical semiconductor amplifier.

53. A wavelength-division multiplex transmitter comprising:

a light sending device including a light sending portion for sending a plurality of signal lights having different wavelengths, and a light combining device for outputting a wavelength division multiplexing light obtained by combining the plurality of signal lights to one end of an optical transmitting path;

a light receiving device including a light dividing device for dividing the wavelength division multiplexing light outputted from the other end of said optical transmitting path into signal lights for each wavelength, and a light receiving portion for converting the divided signal lights into respective electrical signals; and one or more optical amplifying devices disposed between said light sending device and said light receiving device and adapted to amplify the wavelength division multiplexing light propagated through said optical transmitting path; and wherein
said optical amplifying device is an optical amplifying device according to any one of the claims 5 to 52.

* * * * *